April 29, 1958 T. R. MERTON 2,832,259
OPTICAL MEASURING SYSTEMS
Filed Feb. 14, 1956 2 Sheets-Sheet 1
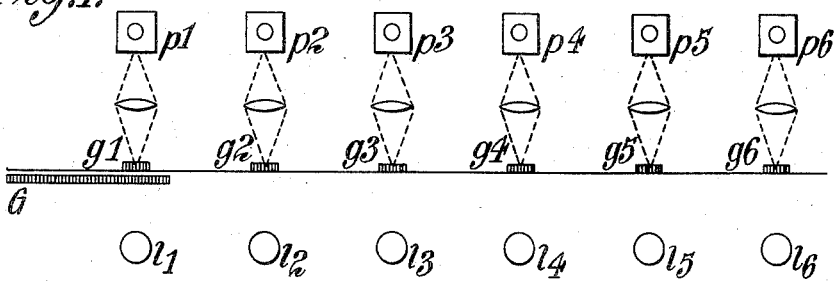
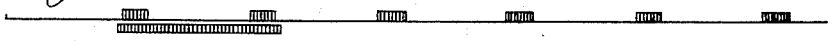
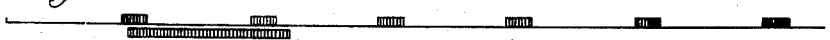
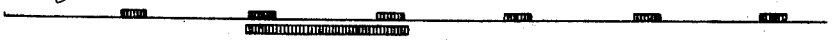
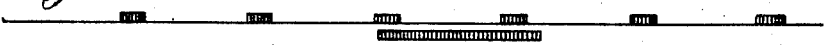
INVENTOR
Thomas R. Merton
By Watson, Cole, Grindle & Watson
ATTORNEYS

United States Patent Office 2,832,259
Patented Apr. 29, 1958

2,832,259

OPTICAL MEASURING SYSTEMS

Thomas Ralph Merton, Maidenhead Thicket, England, assignor to National Research Development Corporation, London, England, a British body corporate Application February 14, 1956, Serial No. 565,473

Claims priority, application Great Britain February 14, 1955

4 Claims. (Cl. 88—14)

This invention comprises improvements in or relating to optical measuring systems.

When two grids or gratings, composed of exactly equidistant strips which alternately transmit and impede the passage of light, are brought into contact so that there is a small angle between the lines in the two gratings, then if the two gratings are viewed against an extended source of light moire fringes are seen, the direction of these moire fringes being at right angles to a line which bisects the angle formed by the intersection of two grating lines on opposing sides. Since in general the angle between the grating lines is small, the moire fringes may be regarded as being substantially at right angles to the grating lines and for convenience, in the description which follows, the grating lines will be assumed to be and will be referred to as vertical lines whilst the moire fringes will be treated as horizontal fringes. The smaller the angle between the vertical lines the further apart will the fringes be; and it is easy with lines say $\frac{1}{2000}$ inch apart to have fringes $\frac{1}{16}$ or more of an inch apart. In this case when the two plates are placed together, if one plate is moved horizontally by $\frac{1}{2000}$ of an inch the horizontal moire fringes will move vertically by a distance exactly equal to their separation. Thus whilst the vertical lines are so close together as to be invisible to the eye a movement of $\frac{1}{2000}$ of an inch produces a shift which can be easily seen and the motion of one plate with respect to the other can be determined by counting the number of moire fringes which pass a given point either visually or more conveniently by means of a photoelectric device.

In the case of gratings where there are many lines to the inch diffraction plays an important part in the appearance of the fringes. If an extended source of light is restricted in width by two straight edged screens and the two gratings are placed at an appropriate distance from the screens the moire fringes can be seen in the central image and, under certain conditions with great clarity, in the first and higher orders of diffraction.

The use of these moire fringes for adjustment and measurement of distance has been known for many years and in a convenient arrangement the fringes which pass when one plate is moved with respect to the other can be counted photoelectrically. A variety of arrangements can be used for this purpose but the essential features are that there should be a source of light on one side of the plates and that an image of the moire pattern (either the central image or the first diffracted order) should be brought to a focus on a slit extending parallel with the fringes and of appropriate length, behind which the photocell is located. The slit and photocell, when used in an arrangement such as described, may be called a "pick-up." The variations in the intensity of the light when the moire fringes pass over the slit can be made, by well established methods, to operate a counter. The distance over which this method can be used to adjust or measure has hitherto been limited by the length of the grating and whilst methods are known of making gratings with very close ruling and of high precision up to about a foot in length, the manufacture of such gratings three feet in length or more with the required degree of perfection would seem to be a formidable if not insuperable task.

It is an object of the present invention to eliminate the need for a ruled grating of great length in making measurements or adjustments of large displacement and according to this invention this is accomplished by the use of a multiplicity of "pick-ups." According to the present invention an optical measuring system comprises a first grating ruled with lines transverse to its length, a plurality of secondary ruled gratings disposed in a line parallel to the length of the first grating, with their lines slightly inclined to the lines on the first grating, the secondary gratings being so spaced that adjacent secondary gratings are in operation relatively to the first grating simultaneously, means for moving the first and secondary gratings relatively to one another in the direction of said line, pick-up means for each secondary grating to view fringes cast thereby from the first grating, and means for adjusting the parts related to each secondary grating so that the fringes cast by each such grating on its pick-up are in step with one another.

This is shown by way of example in a particular case in the accompanying drawings in which, Figure 1 is a diagram of the apparatus with the gratings viewed edge-on;

Figures 2–7 show the movable grating in six further portions of adjustment;

Figure 8:
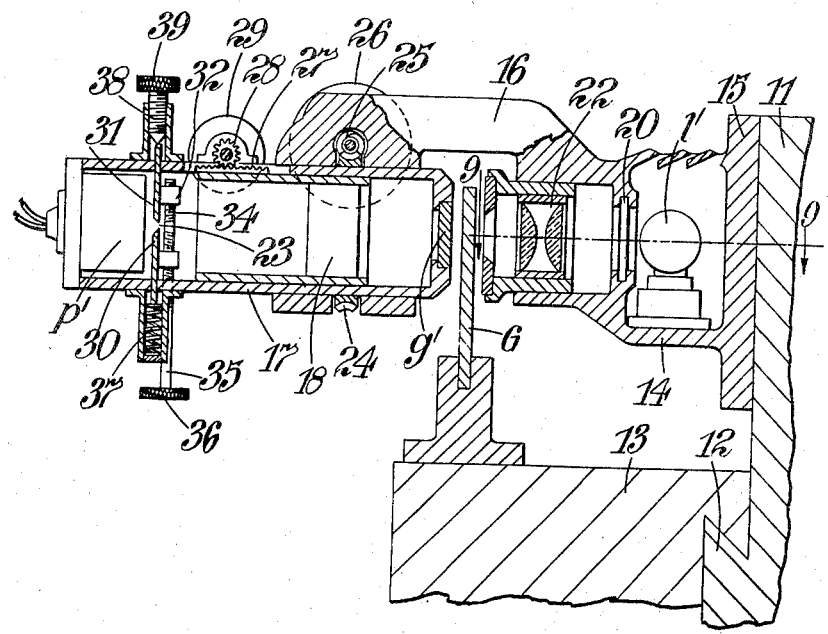
Figure 8 is a diagrammatic section of a "pick-up" station.

In Figure 1, $l_1$, $g_1$ and $p_1$ also $l_2$, $g_2$, $p_2$ etc. represent light sources, small pieces of grating and pick-ups, respectively. The main grating G which is somewhat longer than the distance $g_1$—$g_2$ is attached to a carriage which moves along from the starting position as shown in the diagram to $g_6$ and it is desired to count the numbers of fringes accurately and without discontinuity. The carriage to which G is attached carries a simple electrical contact maker by means of which the pick-ups $p_1$, $p_2$—$p_6$ can be automatically switched on and off when the carriage enters or leaves a position in which they are required, each of these pick-ups when in operation being independently able to operate the counter. Supposing now that the grating moves from the starting position in the direction of $g_6$, the cycle of operations is as follows: In the position shown in Figure 1, $p_1$ is in operation. When the grating reaches the position shown in Figure 2, $p_2$ is switched on simultaneously with $p_1$ (they are thus both operating the counter and it is vital that they should be accurately in step). In the position of Figure 3, $p_1$ cuts out. The distance travelled by G between the positions of Figures 2 and 3 (and 4 and 5) would be in the neighbourhood of a sixteenth of an inch. $p_2$ continues to operate alone until, in the position shown in Figure 4, $p_3$ is switched on and in the position shown in Figure 5 $p_2$ cuts out—and so on.

It is clear that the counting will be uninterrupted and accurate provided that the small gratings $g_1$, $g_2$—$g_6$ are set truly in step. Two adjustments are required for this. The first, which is relatively unimportant, is that the lines on the pieces $g_1$—$g_6$ should all make approximately the same angle with the lines on the main grating G. There is no difficulty in making this adjustment by hand as follows. Set G in the position of Figure 2 and adjust $g_1$ until a suitable fringe system is obtained and clamp in position. Now adjust $g_2$ until there are the same number of fringes to the inch as there are with $g_1$. Move the carriage on to the position of Figure 4 and adjust $g_3$ to match $g_2$—and so on. It must be emphasised that the accuracy of this adjustment is unimportant since the velocity with which the fringes traverse the field is in proportion to the separation of the individual fringes. The choice of a particular separation of the fringes is determined only by the fact that if the fringes are too close they are not sufficiently widely separated on the slit of the pick-up whilst if the fringes are unduly wide too great a strain is put on the perfection of the optical parts. Apart from these considerations a difference in the spacing of the moire fringes of 20% would probably not impair the accuracy.

An adjustment has now to be made to ensure that in the positions of Figures 2, 4 and 6 when the pick-ups are acting simultaneously the pick-ups are accurately synchronous. This adjustment can be carried out with great precision by means of a screw adjustment with which the vertical heights of the horizontal slits on the pick-ups $p_1$, $p_2$—$p_6$ can be varied. As an example: set G in the position of Figure 2 and raise or lower the slit of $p_1$ so that there is a minimum of the fringe system on the slit of $p_1$. Raise or lower $p_2$ until a minimum is on the slit. Move the grating G to the position of Figure 4 and adjust $p_3$— and so on.

In this way a measuring and adjusting device of the highest precision can be constructed of any desired length with small gratings, the manufacture of which is a simple operation and well known in the art.

Figure 9:
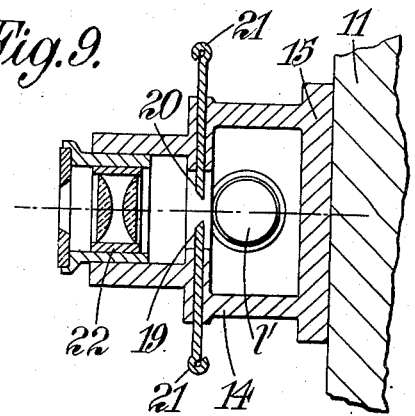
Figure 9 is a section upon the line 9—9 of Figure 8 looking in the direction of the arrows.

The mechanical details of the apparatus are indicated in Figures 8 and 9 in which 11 represents a base having a guide 12 on which operates a carriage 13 supporting the grating G which corresponds to the grating G of Figures 1 to 7. On the base 11 are a number of pick-up assemblies which correspond to the assemblies $g_1$, $p_1$, $g_2$, $p_2$ and so forth of Figure 1 with their accompanying lamps $l_1$, $l_2$ and so on. Figure 8 is a vertical section through one of these assemblies and comprises a lamp house 14 having a base 15 secured to the base 11 and containing a lamp $l_1$. The lamp house is formed in one piece with a bracket 16 in which is rotatably mounted a tube 17 carrying the secondary grating $g_1$, a lens mounting 18 and a light-sensitive cell $p_1$. It will be observed that all these parts are arranged in the same order as that shown in Figure 1. The lamp $l_1$ has an opal or frosted bulb and in front of it, as best seen in Figure 9, are two slidable screens 19, 20, which are fitted with handles 21 and are made friction-tight in their mounting so that they can readily be adjusted in or out to adjust the width of the band of light emitted by the lamp $l_1$. This band is concentrated by a condenser 22 on the grating G close behind which is the secondary grating $g_1$. The lens 18 focusses an image of the bands, seen due to relative movement of the gratings G, $g_1$, upon a slit 23 in front of the light-sensitive cell $p_1$. The lines ruled on the gratings G, $g_1$ are substantially upright and nearly parallel with one another and the slit 23 is horizontal so that the horizontal bands of light and dark which are cast by the lens 18 upon the slit alternately illuminate and extinguish the light passing through the slit as the slide 13 is moved along the guide 12.

In order to adjust the angle of the lines on the grating $g_1$ relative to the lines on the grating G, the tube 17 in which the grating $g_1$ is mounted carries a worm wheel 24 engaged by a worm 25 and capable of adjustment by a knurled head 26. The lens mounting of the lens 18 can be focussed by reason of a rack 27 which it carries and which meshes with the pinion 28 operable by a focussing knob 29. The slit 23 is provided by the space between two sharp edged plates 30, 31 which slide through slots cut in the walls of the tubular mounting 17. The plates 30, 31 carry lugs 32 mounted on one face of them and located to one side of the slit 23. The lugs 32 are screw-threaded to receive a right and lefthand screw 34 which unites them together and has a spindle 35 passing through the wall of the tube and terminating in an adjusting knob 36. By rotating the spindle 35, the width of the slit between the plates 30, 31 can be varied. A spring 37 urges this assembly upwards and an adjusting screw 38 having an operating knob 39 presses it downwards so that the slit can be adjusted into a position where the image cast from the grating $g_1$ coincides with the image cast at the other end of the main grating G, when it reaches the position shown in Figure 2 and overlaps the second grating $g_2$.

By having a series of assemblies such as are shown in Figures 8 and 9 for each of the lamps $p_1$ to $l_6$ inclusive and synchronizing them all by means of the knobs 39, the impulses given by the light-sensitive cells $p_1$, $p_2$ etc. will all fit with one another.

I claim:

1. An optical measuring system comprising a first grating ruled with lines transverse to its length, a plurality of secondary ruled gratings disposed in a line parallel to the length of the first grating, with their lines slightly inclined to the lines on the first grating, the secondary gratings being so spaced that adjacent secondary gratings are in operation relatively to the first grating simultaneously, means for moving the first and secondary gratings relatively to one another in the direction of said line, pick-up means for each secondary grating to view fringes cast thereby from the first grating, and means for adjusting the parts related to each secondary grating so that the fringes cast by each such grating on its pick-up are in step with one another.

2. An optical measuring system as claimed in claim 1 wherein the secondary gratings are provided with means to adjust them angularly.

3. An optical measuring system as claimed in claim 1 wherein the pick-up means comprises, for each secondary grating, a lens for foscussing an image of the fringe, a slot at the focus and a light-sensitive counting device behind the slot to count the fringes as they travel past the slot.

4. An optical measuring system as claimed in claim 3 wherein the means for adjusting the parts to bring the fringes for the secondary gratings into step with one another comprise means for adjusting the position of each slot in the pick-up means.

References Cited in the file of this patent

UNITED STATES PATENTS

| | | |
|---|---|---|
| 1,800,044 | Baird | Apr. 7, 1931 |
| 2,301,396 | Graf | Nov. 10, 1942 |
| 2,406,299 | Koulicovitch | Aug. 20, 1946 |
| 2,410,550 | Padva | Nov. 5, 1946 |

FOREIGN PATENTS

| | | |
|---|---|---|
| 476,720 | Canada | Sept. 4, 1951 |